United States Patent
Pan et al.

(10) Patent No.: US 11,508,366 B2
(45) Date of Patent: Nov. 22, 2022

(54) WHISPERING VOICE RECOVERY METHOD, APPARATUS AND DEVICE, AND READABLE STORAGE MEDIUM

(71) Applicant: IFLYTEK CO., LTD., Anhui (CN)

(72) Inventors: Jia Pan, Anhui (CN); Cong Liu, Anhui (CN); Haikun Wang, Anhui (CN); Zhiguo Wang, Anhui (CN); Guoping Hu, Anhui (CN)

(73) Assignee: IFLYTEK CO., LTD., Hefei (CN)

( * ) Notice: Subject to any disclaimer, the term of this patent is extended or adjusted under 35 U.S.C. 154(b) by 210 days.

(21) Appl. No.: 16/647,284

(22) PCT Filed: Jun. 15, 2018

(86) PCT No.: PCT/CN2018/091460
§ 371 (c)(1),
(2) Date: Mar. 13, 2020

(87) PCT Pub. No.: WO2019/196196
PCT Pub. Date: Oct. 17, 2019

(65) Prior Publication Data
US 2020/0211550 A1     Jul. 2, 2020

(30) Foreign Application Priority Data
Apr. 12, 2018 (CN) .......................... 201810325696.3

(51) Int. Cl.
*G10L 15/22*     (2006.01)
*G10L 15/06*     (2013.01)
(Continued)

(52) U.S. Cl.
CPC .............. *G10L 15/22* (2013.01); *G06N 3/049* (2013.01); *G10L 15/063* (2013.01); *G10L 15/25* (2013.01);
(Continued)

(58) Field of Classification Search
CPC ..... G10L 15/00; G10L 15/049; G10L 15/063; G10L 15/22; G10L 25/03; G10L 25/30; G10L 2015/0635
See application file for complete search history.

(56) References Cited

U.S. PATENT DOCUMENTS 6,317,716 B1 * 11/2001 Braida ................. G09B 21/009
                                                              704/270
6,594,632 B1 * 7/2003 White ..................... G10L 15/22
                                                              704/246
(Continued)

FOREIGN PATENT DOCUMENTS

CN         1204826 A      1/1999
CN      101154385 A      4/2008
(Continued)

OTHER PUBLICATIONS

Zhang, Chi, and John HL Hansen. "Whisper-island detection based on unsupervised segmentation with entropy-based speech feature processing." IEEE Transactions on Audio, Speech, and Language Processing 19.4 (2010): 883-894.*
(Continued)

*Primary Examiner* — Paras D Shah
(74) *Attorney, Agent, or Firm* — Zhong Law, LLC

(57) ABSTRACT

A method, an apparatus and a device for converting a whispered speech, and a readable storage medium are provided. The method is implemented based on the whispered speech converting model. The whispered speech converting model is trained in advance by using recognition results and whispered speech training acoustic features of whispered speech training data as samples and using normal speech acoustic features of normal speech data parallel to the whispered speech training data as sample labels. A whispered speech acoustic feature and a preliminary recognition result of whispered speech data are acquired, then the
(Continued)

whispered speech acoustic feature and the preliminary recognition result are inputted into a preset whispered speech converting model to acquire a normal speech acoustic feature outputted by the model. In this way, the whispered speech can be converted to a normal speech.

18 Claims, 8 Drawing Sheets

(51) Int. Cl.
*G10L 15/25* (2013.01)
*G10L 25/03* (2013.01)
*G10L 25/30* (2013.01)
*G06N 3/04* (2006.01)

(52) U.S. Cl.
CPC .............. *G10L 25/03* (2013.01); *G10L 25/30* (2013.01); *G10L 2015/0635* (2013.01); *G10L 2015/227* (2013.01)

(56) References Cited

U.S. PATENT DOCUMENTS

| | | | |
|---|---|---|---|
| 7,979,270 | B2 | 7/2011 | Yamada |
| 10,665,243 | B1* | 5/2020 | Whitmire .............. G10L 15/187 |
| 2011/0071830 | A1 | 3/2011 | Kim et al. |
| 2011/0282669 | A1 | 11/2011 | Michaelis |
| 2016/0019886 | A1* | 1/2016 | Hong ..................... G06F 1/1684 704/231 |
| 2016/0360372 | A1* | 12/2016 | Chen ....................... H04W 4/80 |
| 2019/0189145 | A1* | 6/2019 | Rakshit .................. G10L 15/22 |

FOREIGN PATENT DOCUMENTS

| | | |
|---|---|---|
| CN | 101527141 | 9/2009 |
| CN | 102023703 | 4/2011 |
| CN | 102254556 A | 11/2011 |
| CN | 104484656 A | 4/2015 |
| CN | 104537358 A | 4/2015 |
| CN | 106571135 A | 4/2017 |
| CN | 106847271 A | 6/2017 |
| CN | 107452381 | 12/2017 |
| CN | 107680597 A | 2/2018 |
| JP | 2006119647 A | 5/2006 |
| JP | 2016186515 A | 10/2016 |
| WO | 2009014777 A1 | 1/2009 |

OTHER PUBLICATIONS

Ghaffarzadegan, Shabnam, Hynek Bozñl, and John HL Hansen. "Generative modeling of pseudo-whisper for robust whispered speech recognition." IEEE/ACM Transactions on Audio, Speech, and Language Processing 24.10 (2016): 1705-1720. (Year: 2016).*
Chinese Office Action received in 201810325696.3 dated Mar. 24, 2020, pp. 18.
Yang et al., "The Lip Animation Modeling Studies Based Graphics", Computer Knowledge and Tech, Jan. 2013, vol. 9, No. 1, pp. 180-182.
Houde et al., "Sensorimotor Adaptation in Speech Production", Sep. 2016, vol. 279, pp. 1213-1217.
Japanese Office Action received in 2019519686 dated Jun. 25, 2020, pp. 15.
Ghaffarzadegan et al., "Generative Modeling of Pseudo-Target Domain Adaptation Samples for Whispered Speech Recognition", ICASSP, 2015, pp. 5024-5028.
FAO et al.,"Bimodal Recurrent Neural Network for Audiovisual Voice Activity Detection", ISCA, 2017, pp. 1938-1942.
Madikeri et al., "Mel Filter Bank Energy-Based Slope Feature and its Application to Speaker Recognition", NCC, 2011, pp. 1-4.
Olah et al., "Attention and Augmented Recurrent Neural Networks", Distall, 2016, pp. 1-11.
International Search Report and the Written Opinion issued in PCT/CN2018/091460 dated Jan. 9, 2019, 14 pages.

* cited by examiner

WHISPERING VOICE RECOVERY METHOD, APPARATUS AND DEVICE, AND READABLE STORAGE MEDIUM

FIELD

This application is a national phase application of PCT international patent application PCT/CN2018/091460, filed on Jun. 15, 2018 which claims priority to Chinese Patent Application No. 201810325696.3 titled "METHOD, APPARATUS AND DEVICE FOR CONVERTING WHISPERED SPEECH, AND READABLE STORAGE MEDIUM" and filed with the Chinese Patent Office on Apr. 12, 2018, both of which are incorporated herein by reference in their entireties.

BACKGROUND

Speech recognition can enable a machine capable of automatically converting a speech to a corresponding text using a machine learning method, thus giving the machine a human-like hearing function. Speech recognition is an important part of artificial intelligence. With the continuous breakthroughs of artificial intelligence technology and the increasing popularity of various intelligent terminal devices, speech recognition, as an important part of human-computer interaction, is widely used in various intelligent terminals. More and more users are accustomed to input a speech to the terminal.

The speech includes a normal speech and a whispered speech. The whispered speech refers to a speech generated when a user whispers, and the normal speech is a speech generated when the user speaks normally. The pronunciation of the normal speech is different from the pronunciation of the whispered speech. When the normal speech is pronounced, the human vocal cord has a regular (with a certain pattern) and periodic vibration, where the frequency of the vibration is called a fundamental frequency. When the whispered speech is pronounced, the vibration of the vocal cord is not obvious, and the vocal cord has an irregular or random vibration; namely, there is no fundamental frequency. Even if the volume of the whispered speech is amplified, the pronunciation of the whispered speech is different from the pronunciation of the normal speech.

However, in a meeting scenario or a scenario relating to privacy, an input with a normal speech may cause some inconvenience. Instead, many users may choose to whisper, which causes a problem that the machine can not accurately identify what the user said. In addition, there are many patients with aphasia whose pronunciation is similar to the pronunciation of the whispered speech. In view of this, there is an urgent need in the conventional technology for a solution capable of converting the whispered speech to the normal speech.

SUMMARY

In view of this, a method, an apparatus, a device and a readable storage medium for converting a whispered speech to convert whispered speech data with a high accuracy are provided in the present disclosure.

In order to achieve the above objective, following solutions are provided.

A method for converting a whispered speech includes:

acquiring a whispered speech acoustic feature of whispered speech data, and acquiring a preliminary recognition result of the whispered speech data; and inputting the whispered speech acoustic feature and the preliminary recognition result into a preset whispered speech converting model to acquire a normal speech acoustic feature outputted by the whispered speech converting model, where the whispered speech converting model is trained in advance by using recognition results of whispered speech training data and whispered speech training acoustic features of the whispered speech training data as samples, and using normal speech acoustic features of normal speech data parallel to the whispered speech training data as sample labels.

Preferably, the method further includes: determining a final recognition result of the whispered speech data based on the normal speech acoustic feature.

Preferably, the acquiring the preliminary recognition result of the whispered speech data includes:

inputting the whispered speech acoustic feature into a preset whispered speech recognition model to acquire a whispered speech recognition result outputted by the whispered speech recognition model as the preliminary recognition result of the whispered speech data, where the whispered speech recognition model is acquired by taking a normal speech recognition model as an initial model and training the initial model by using the whispered speech training acoustic features labeled with recognition results of whispered speech training data.

Preferably, the method further includes: acquiring lip shape image data matching the whispered speech data. The acquiring the preliminary recognition result of the whispered speech data further includes:

inputting the lip shape image data into a preset lip shape recognition model to acquire a lip shape recognition result outputted by the lip shape recognition model, where the lip shape recognition model is trained in advance by using lip shape image training data labeled with lip shape recognition results; and merging the whispered speech recognition result and the lip shape recognition result to acquire a merged recognition result as the preliminary recognition result of the whispered speech data.

Preferably, the method further includes:

performing lip detection on each frame of lip shape images of the lip shape image data to acquire a lip region; and extracting the lip region from the corresponding lip shape image, performing an image regularization process on the lip region to acquire regularized lip shape image data as an input of the lip shape recognition model.

Preferably, the acquiring the whispered speech acoustic feature of the whispered speech data includes:

segmenting the whispered speech data into frames and acquiring multiple frames of whispered speech data;

performing a pre-emphasis process on each frame of whispered speech data to acquire a frame of pre-emphasis processed whispered speech data; and extracting a spectrum feature of each frame of pre-emphasis processed whispered speech data, where the spectrum feature includes one or more of a LogFilter Bank Energy feature, a Mel Frequency Cepstrum Coefficient feature, or a Perceptual Linear Predictive feature.

Preferably, the inputting the whispered speech acoustic feature and the preliminary recognition result into the preset whispered speech converting model to acquire the normal speech acoustic feature outputted by the whispered speech converting model includes:

inputting the whispered speech acoustic feature and the preliminary recognition result into a whispered speech converting model having a recurrent neural network type, to acquire the normal speech acoustic feature outputted by the whispered speech converting model.

Preferably, the inputting the whispered speech acoustic feature and the preliminary recognition result into the preset whispered speech converting model to acquire the normal speech acoustic feature outputted by the whispered speech converting model includes:

inputting the whispered speech acoustic feature and the preliminary recognition result into a whispered speech converting model having a codec type of attention-based mechanism;

encoding the whispered speech acoustic feature and the preliminary recognition result by using a coding layer of the whispered speech converting model, to acquire an encoded whispered speech acoustic feature and an encoded preliminary recognition result;

performing coefficient linear weighting on the encoded whispered speech acoustic feature by using an attention layer of the whispered speech converting model, to acquire a weighted whispered speech acoustic feature at a current time instant; and taking the encoded preliminary recognition result, the weighted whispered speech acoustic feature at the current time instant, and an output of a decoding layer of the whispered speech converting model at the previous time instant as an input of the decoding layer at the current time instant, to acquire an output of the decoding layer at the current time instant as the normal speech acoustic feature.

Preferably, the determining the final recognition result of the whispered speech data based on the normal speech acoustic feature includes:

inputting the normal speech acoustic feature into a preset normal speech recognition model to acquire a normal speech recognition result outputted by the normal speech recognition model; and determining the normal speech recognition result as the final recognition result of the whispered speech data.

Preferably, the determining the final recognition result of the whispered speech data based on the normal speech acoustic feature includes:

inputting the normal speech acoustic feature into a preset normal speech recognition model to acquire a normal speech recognition result outputted by the normal speech recognition model;

determining whether a preset iteration termination condition is satisfied;

determining the normal speech recognition result as the final recognition result of the whispered speech data responsive to determining that the preset iteration termination condition is satisfied; and determining the normal speech recognition result as the preliminary recognition result and returning to perform the process of inputting the whispered speech acoustic feature and the preliminary recognition result into the preset whispered speech converting model responsive to determining that the preset iteration termination condition is not satisfied.

An apparatus for converting a whispered speech includes:

a whispered speech acoustic feature acquiring unit, configured to acquire a whispered speech acoustic feature of whispered speech data;

a preliminary recognition result acquiring unit, configured to acquire a preliminary recognition result of the whispered speech data;

a whispered speech converting unit, configured to input the whispered speech acoustic feature and the preliminary recognition result into a preset whispered speech converting model to acquire a normal speech acoustic feature outputted by the whispered speech converting model, where the whispered speech converting model is trained in advance by using recognition results of whispered speech training data and whispered speech training acoustic features of the whispered speech training data as samples, and using normal speech acoustic features of normal speech data parallel to the whispered speech training data as sample labels.

Preferably, the apparatus further includes a final recognition result determining unit configured to determine a final recognition result of the whispered speech data based on the normal speech acoustic feature.

Preferably, the preliminary recognition result acquiring unit includes:

a first preliminary recognition result acquiring subunit, configured to input the whispered speech acoustic feature into a preset whispered speech recognition model to acquire a whispered speech recognition result outputted by the whispered speech recognition model as the preliminary recognition result of the whispered speech data, where the whispered speech recognition model is acquired by taking a normal speech recognition model as an initial model and training the initial model by using the whispered speech training acoustic features labeled with recognition results of whispered speech training data.

Preferably, the apparatus further includes a lip shape image data acquiring unit configured to acquire lip shape image data matching the whispered speech data. The preliminary recognition result acquiring unit further includes:

a second preliminary recognition result acquiring subunit, configured to input the lip shape image data into a preset lip shape recognition model to acquire a lip shape recognition result outputted by the lip shape recognition model, where the lip shape recognition model is trained in advance by using lip shape image training data labeled with lip shape recognition results; and a third preliminary recognition result acquiring subunit, configured to merge the whispered speech recognition result and the lip shape recognition result to acquire a merged recognition result as the preliminary recognition result of the whispered speech data.

Preferably, the apparatus further includes:

a lip detecting unit, configured to perform lip detection on each frame of lip shape images of the lip shape image data to acquire a lip region; and an image processing unit, configured to extract the lip region from the corresponding lip shape image and perform an image regularization process on the lip region to acquire regularized lip shape image data as an input of the lip shape recognition model.

Preferably, the whispered speech acoustic feature acquiring unit includes:

a framing processing unit, configured to segment the whispered speech data into frames and to acquire multiple frames of whispered speech data;

a pre-emphasis processing unit, configured to perform a pre-emphasis process on each frame of whispered speech data to acquire a frame of pre-emphasis processed whispered speech data; and a spectrum feature extracting unit, configured to extract a spectrum feature of each frame of pre-emphasis processed whispered speech data, where the spectrum feature includes one or more of a LogFilter Bank Energy feature, a Mel Frequency Cepstrum Coefficient feature, or a Perceptual Linear Predictive feature.

Preferably, the whispered speech converting unit includes a recursive processing unit configured to input the whispered speech acoustic feature and the preliminary recognition result into a whispered speech converting model having a recurrent neural network type, to acquire the normal speech acoustic feature outputted by the whispered speech converting model.

Preferably, the whispered speech converting unit includes a codec processing unit. The codec processing unit includes:

a first codec processing subunit, configured to input the whispered speech acoustic feature and the preliminary recognition result into a whispered speech converting model having a codec type of attention-based mechanism;

a second codec processing subunit, configured to encode the whispered speech acoustic feature and the preliminary recognition result by using a coding layer of the whispered speech converting model, to acquire an encoded whispered speech acoustic feature and an encoded preliminary recognition result;

a third codec processing subunit, configured to perform coefficient linear weighting on the encoded whispered speech acoustic feature by using an attention layer of the whispered speech converting model, to acquire a weighted whispered speech acoustic feature at a current time instant; and a fourth codec processing subunit, configured to take the encoded preliminary recognition result, the weighted whispered speech acoustic feature at the current time instant, and an output of a decoding layer of the whispered speech converting model at the previous time instant as an input of the decoding layer at the current time instant, to acquire an output of the decoding layer at the current time instant as the normal speech acoustic feature.

Preferably, the final recognition result determining unit includes:

a normal speech recognition unit, configured to input the normal speech acoustic feature into a preset normal speech recognition model to acquire a normal speech recognition result outputted by the normal speech recognition model; and a first result determining unit, configured to determine the normal speech recognition result as the final recognition result of the whispered speech data.

Preferably, the final recognition result determining unit includes:

a normal speech recognition unit, configured to input the normal speech acoustic feature into a preset normal speech recognition model to acquire a normal speech recognition result outputted by the normal speech recognition model;

an iteration determining unit, configured to determine whether a preset iteration termination condition is satisfied;

a second result determining unit, configured to determine the normal speech recognition result as the final recognition result of the whispered speech data responsive to determining that the iteration determining unit determines that the preset iteration termination condition is met; and a third result determining unit, configured to determine the normal speech recognition result as the preliminary recognition result and return to perform the process of inputting the whispered speech acoustic feature and the preliminary recognition result into the preset whispered speech converting model responsive to determining that the iteration determining unit determines that the preset iteration termination condition is not satisfied.

A device for converting a whispered speech includes a memory and a processor. The memory is configured to store programs. The processor is configured to execute the programs to perform steps of the above method for converting a whispered speech.

A readable storage medium storing computer programs. The computer programs are executed by a processor to perform steps of the above method for converting a whispered speech.

It can be seen from the above technical solutions that, the method for converting a whispered speech according to the embodiment of the present disclosure is implemented based on the whispered speech converting model. The whispered speech converting model is trained in advance by using recognition results of whispered speech training data and whispered speech training acoustic features of the whispered speech training data as samples, and using normal speech acoustic features of normal speech data parallel to the whispered speech training data as sample labels. In this disclosure, a whispered speech acoustic feature of whispered speech data and a preliminary recognition result of the whispered speech data are acquired, then the whispered speech acoustic feature and the preliminary recognition result are inputted into a preset whispered speech converting model to acquire a normal speech acoustic feature outputted by the whispered speech converting model. In this way, the whispered speech can be converted to a normal speech, so that users can accurately understand the content expressed by each other in whispered speech scenes.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology can become clearer. It is apparent that the drawings in the following description only illustrate embodiments of the present disclosure. For those skilled in the art, other drawings may be acquired according to these drawings without any creative work.

DETAILED DESCRIPTION OF EMBODIMENTS

The technical solutions according to the embodiments of the present disclosure are described clearly and completely as follows in conjunction with the drawings. It is apparent that the described embodiments are only a few rather than all of the embodiments according to the present disclosure. Any other embodiments acquired by those skilled in the art based on the embodiments in the present disclosure without any creative efforts fall within the protection scope of the present disclosure.

Figure 1:
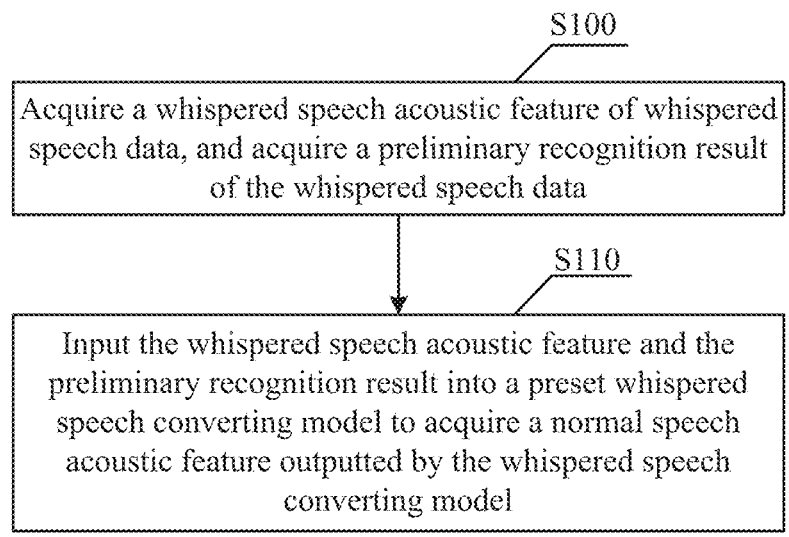
FIG. 1 is a flowchart of a method for converting a whispered speech according to an embodiment of the present disclosure.

Referring to FIG. 1, the method for converting a whispered speech according to the present disclosure is described. As shown in FIG. 1, the method includes steps S100 to S110.

In step S100, a whispered speech acoustic feature of whispered speech data and a preliminary recognition result of the whispered speech data are acquired.

In this step, the whispered speech acoustic feature of the whispered speech data inputted externally may be directly acquired, or the whispered speech acoustic feature of the whispered speech data may be determined based on the whispered speech data.

Furthermore, the preliminary recognition result of the whispered speech data may be inputted externally, or may be determined based on the whispered speech data.

The preliminary recognition result of the whispered speech data may be inaccurate and thus cannot be directly used as the final recognition result.

The whispered speech data may be collected using the terminal device, and the terminal device may be a mobile phone, a personal computer, a tablet computer, and the like. The whispered speech data may be collected with a microphone on the terminal device.

In step S110, the whispered speech acoustic feature and the preliminary recognition result are inputted into a preset whispered speech converting model to acquire a normal speech acoustic feature outputted by the whispered speech converting model.

The whispered speech converting model is trained in advance by using recognition results of whispered speech training data and whispered speech training acoustic features of the whispered speech training data as samples, and using normal speech acoustic features of normal speech data parallel to the whispered speech training data as sample labels.

In other words, training samples of the whispered speech converting model may include whispered speech training acoustic features of the whispered speech training data and corresponding recognition results of the whispered speech training data. The sample labels include normal speech acoustic features of the normal speech data parallel to the whispered speech training data.

The whispered speech training data being parallel to the normal speech data refers to a case that the whispered speech training data and the normal speech data are generated by the same speaker in the same situation, including the same device, the same environment, the same speech rate and the same mood or the like, respectively in a whisper manner and in a normal manner.

The recognition result of the whispered speech training data may be manually labeled. Alternatively, similar to step S100, a preliminary recognition result of the whispered speech training data inputted externally may be acquired as the recognition result of the whispered speech training data.

In this embodiment, the normal speech acoustic feature of the whispered speech data may be predicted based on the whispered speech converting model and the whispered speech acoustic feature and the preliminary recognition result. In this way the whispered speech is converted to a normal speech, and users can accurately understand the content expressed by each other in whispered speech scenes.

Figure 2:
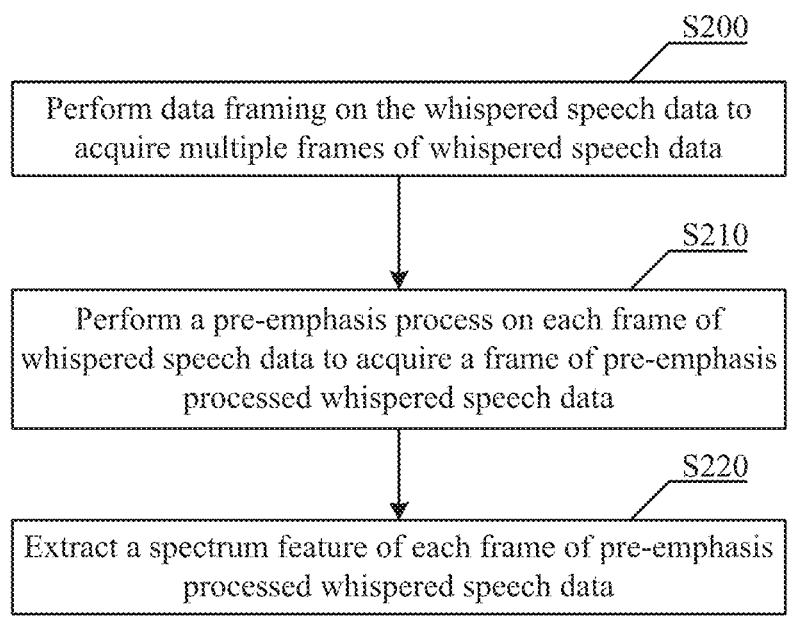
FIG. 2 is a flowchart of a method for acquiring a whispered speech acoustic feature according to an embodiment of the present disclosure.

In an embodiment of the present disclosure, the process of acquiring the whispered speech acoustic feature of the whispered speech data in the above step S100 is described. Referring to FIG. 2, the process may include steps S200 to S220.

In step S200, the whispered speech data is segmented into frames to acquire multiple frames of whispered speech data.

In step S210, a pre-emphasis process is performed on each frame of whispered speech data to acquire a frame of pre-emphasis processed whispered speech data.

In step S220, a spectrum feature of each frame of pre-emphasis processed whispered speech data is extracted.

The spectrum feature may include one or more of a LogFilter Bank Energy feature, a Mel Frequency Cepstrum Coefficient (MFCC) feature, or a Perceptual Linear Predictive (PLP) feature.

Furthermore, the process of acquiring the preliminary recognition result of the whispered speech data in the above step S100 is described. Two approaches acquiring the preliminary recognition result provided in the embodiment are described as follows.

The first approach to acquiring the preliminary recognition result is implemented based on a whispered speech recognition model.

In this embodiment, the whispered speech recognition model is acquired in advance by taking a normal speech recognition model as an initial model and training the initial model by using whispered speech training acoustic features labeled with recognition results of whispered speech training data.

The normal speech recognition model is trained by using normal speech training acoustic features labeled with recognition results of normal speech training data.

In this embodiment, because the cost associated with collecting the whispered speech data is relatively high, generally, less whispered speech data is collected. Therefore, it is difficult to have a good coverage in the aspects of the speaker, environment or the like, thereby causing a significant decrease in the recognition rate for a case that is not well covered by the whispered speech training data. Based on this, the whispered speech recognition model designed in this disclosure is acquired by adapting the normal speech recognition model as follows.

Firstly, a large amount of normal speech data manually labeled with recognition results and a small amount of whispered speech data manually labeled with recognition results are collected.

Secondly, normal speech acoustic features of the normal speech data and whispered speech acoustic features of the whispered speech data are extracted.

Thirdly, the normal speech recognition model is trained by using the normal speech acoustic features and the recognition results manually labeled in the normal speech data.

Finally, the trained normal speech recognition model is taken as the initial model, and the initial model is trained by using the whispered speech acoustic features and the recognition results manually labeled in the whispered speech data, to acquire the whispered speech recognition model.

Based on the whispered speech recognition model acquired by the training in this embodiment, the whispered speech acoustic feature of the whispered speech data is inputted into the whispered speech recognition model to acquire a whispered speech recognition result outputted by the whispered speech recognition model as the preliminary recognition result of the whispered speech data.

It should be understood that, in this embodiment, the whispered speech recognition model may also be trained only based on the whispered speech data and the recognition results of the whispered speech data.

The second approach to acquiring the preliminary recognition result is implemented based on the whispered speech recognition model and a lip shape recognition model.

Based on the first approach to acquiring the preliminary recognition result, a lip shape recognition process is further combined in the embodiment to comprehensively determine the preliminary recognition result of the whispered speech data.

Lip shape image data matched with the whispered speech data may be further acquired in this embodiment. The lip shape image data is an image of the lip shape captured when the user speaks out the whispered speech data.

Based on this, the lip shape recognition model is trained in advance in the present disclosure. The lip shape recognition model is trained in advance by using lip shape image training data labeled with lip shape recognition results.

The lip shape image data matched with the whispered speech data is inputted into the lip shape recognition model to acquire a lip shape recognition result outputted by the lip shape recognition model.

Optionally, in an embodiment, after the lip shape image data matching the whispered speech data is acquired, a preprocessing operation may be further performed on the lip shape image data. The preprocessed lip shape image data is used as an input of the lip shape recognition model.

The preprocessing operation performed on the lip shape image data may include:

performing lip detection on each frame of lip shape images of the lip shape image data to acquire a lip region, where an object detection technique, such as a FasterRCNN model may be used for the lip detection;

extracting the lip region from the corresponding lip shape image, performing an image regularization process on the lip region to acquire regularized lip shape image data as an input of the lip shape recognition model.

In the image regularization process, the images may be scaled to a preset size, such as 32×32 pixels or other sizes. Various conventional image scaling techniques, such as linear interpolation, may be adopted in the image regularization process.

Figure 3:
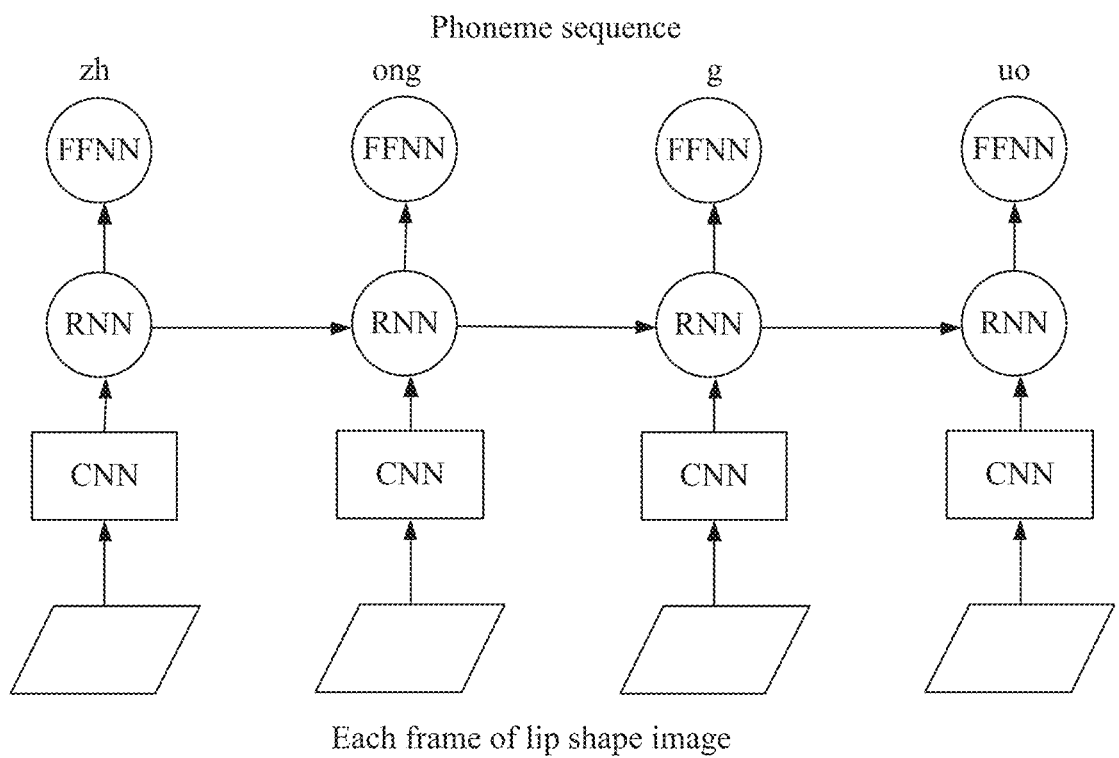
FIG. 3 is a schematic structural diagram of a lip shape recognition model.

Referring to FIG. 3, a schematic structural diagram of a lip shape recognition model is showed.

The preprocessed lip shape image sequence is used as an input to the model. Firstly, a feature expression of each frame of lip shape image is acquired by using the convolution neural network CNN. The structure of the convolution neural network is not limited, and may be a VGG structure or a residual structure commonly used in conventional image recognitions. Furthermore, a feature expression of the lip shape image sequence is formed by using a recurrent neural network RNN. The feature expression of the lip shape image sequence passes through the feed forward neural network FFNN and then is connected with an output layer. The output layer outputs a phoneme sequence or a phoneme state sequence corresponding to the inputted lip shape image sequence.

The phoneme sequence outputted by the output layer illustrated in FIG. 3 is "zh, ong, g, uo".

Based on the lip shape recognition result introduced above, the lip recognition result and the whispered speech recognition result outputted by the whispered speech recognition model are merged to obtain a merged recognition result as the preliminary recognition result of the whispered speech data.

The conventional model merging method, such as Recognizer Output Voting Error Reduction (ROVER) method or other merging methods may be adopted in the process of merging the lip shape recognition result and the whispered speech recognition result outputted by the whispered speech recognition model.

By combining the lip shape recognition result with the whispered speech recognition result, the whispered speech recognition accuracy is improved, and the preliminary recognition result of the determined whispered speech data becomes more accurate.

In another embodiment of the present disclosure, an implementation of the above step S110 of inputting the whispered speech acoustic feature and the preliminary recognition result into a preset whispered speech converting model to acquire a normal speech acoustic feature outputted by the whispered speech converting model is described.

Two types of whispered speech converting models are provided in this embodiment as follows.

Figure 4:
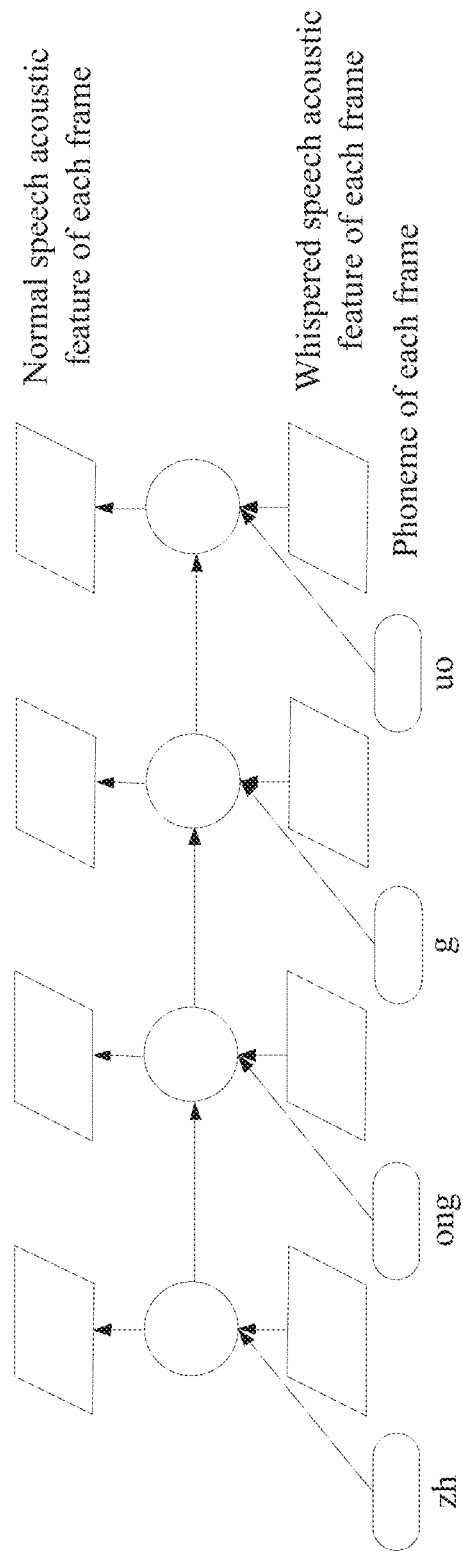
FIG. 4 is a schematic structural diagram of a whispered speech converting model having a recurrent neural network type.

The first type of whispered speech converting model:

The whispered speech converting model has a recurrent neural network type. FIG. 4 is a schematic structural diagram of a whispered speech converting model having a recurrent neural network type.

The input layer includes two types of data, which are the whispered speech acoustic feature of each frame and the preliminary recognition result of each frame. In FIG. 4, the preliminary recognition result is described with an example of the phoneme sequence "zh, ong, g, uo".

The output layer outputs the normal speech acoustic feature of each frame.

Based on the whispered speech converting model described above, in the embodiment, the whispered speech acoustic feature and the preliminary recognition result may be inputted into a whispered speech converting model having a recurrent neural network type, to acquire the normal speech acoustic feature outputted by the whispered speech converting model.

The preliminary recognition result inputted into the model may be a vectorization preliminary recognition result.

Figure 5:
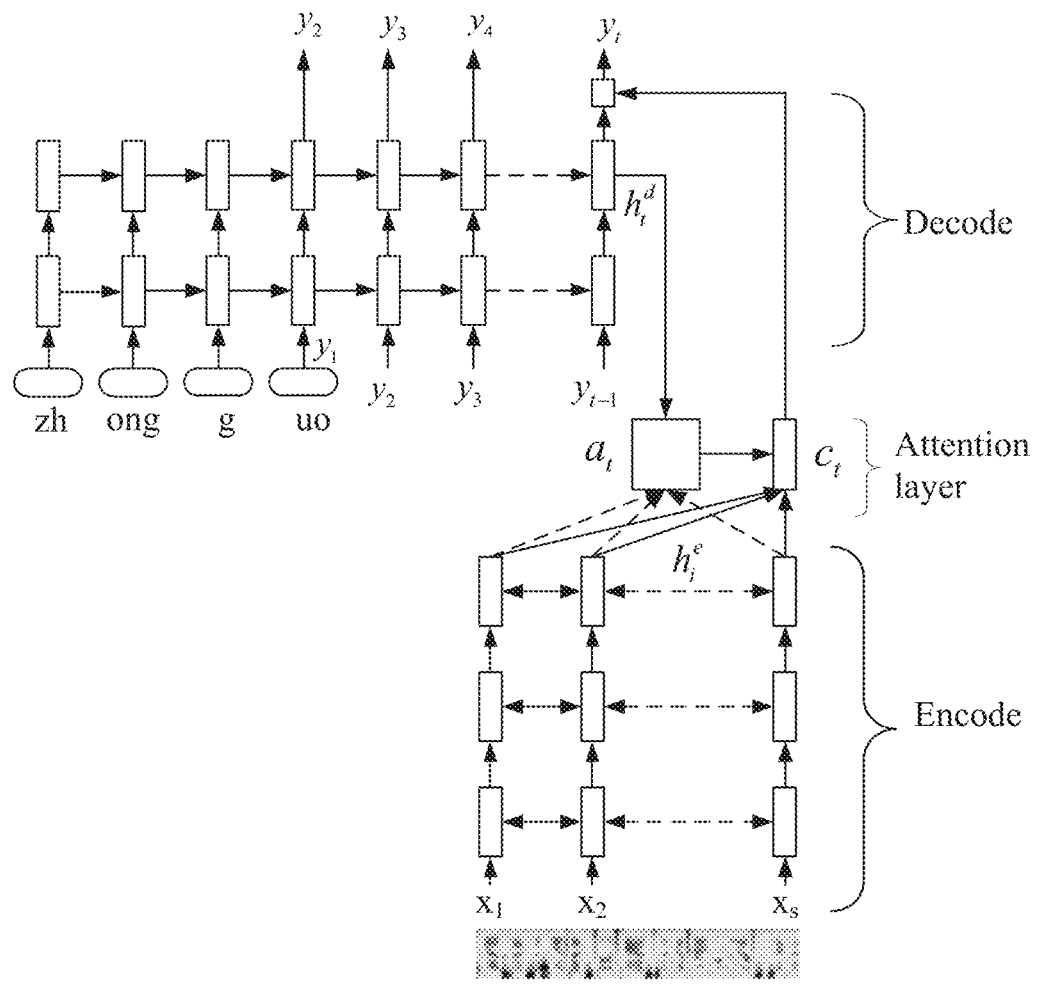
FIG. 5 is a schematic structural diagram of a whispered speech converting model having a codec type of attention-based mechanism.

The second type of whispered speech converting model:

The whispered speech converting model has a codec type of the attention-based mechanism. FIG. 5 is a schematic structural diagram of a whispered speech converting model having a codec type of attention-based mechanism.

The input layer includes two types of data, which are the whispered speech acoustic features $x_1$ to $x_s$ of each frame and the preliminary recognition result of each frame. In FIG. 5, the preliminary recognition result is described with an example of the phoneme sequence "zh, ong, g, uo".

The whispered speech acoustic feature of each frame is encoded by using a coding layer to acquire an encoded whispered speech acoustic feature $h_i^e$, where, $i \in [1,s]$. An attention layer determines a coefficient vector $a_t$ of the whispered speech acoustic features of each frame at the current time instant t based on the coded whispered speech acoustic feature $h_t^e$ and a hidden layer variable $h_t^d$ of the decoding layer at the current time instant t. The coefficient vector $a_t$ is multiplied by the vector composed of the encoded whispered speech acoustic features $h_t^e$ of each frame, to acquire a weighted whispered speech acoustic feature $C_t$ at the current time instant. The encoded preliminary recognition result, the weighted whispered speech acoustic feature $C_t$ at the current time instant, and an output $y_{t-1}$ of the decoding layer at the previous time instant t−1 are taken as an input of the decoding layer at the current time instant t, to acquire an output $y_t$ of the decoding layer at the current time instant t as the normal speech acoustic feature.

Based on the whispered speech converting model described above, the normal speech acoustic feature may be determined based on the model with the following steps 1) to 4).

In step 1), the whispered speech acoustic feature and the preliminary recognition result are inputted into a whispered speech converting model having a codec type of attention-based mechanism. The preliminary recognition result inputted into the model may be a vectorization preliminary recognition result.

In step 2), the whispered speech acoustic feature and the preliminary recognition result are encoded by using a coding layer of the whispered speech converting model, to acquire an encoded whispered speech acoustic feature and an encoded preliminary recognition result.

In step 3), coefficient linear weighting is performed on the encoded whispered speech acoustic feature by using an attention layer of the whispered speech converting model, to acquire a weighted whispered speech acoustic feature at a current time instant.

In step 4), the encoded preliminary recognition result, the weighted whispered speech acoustic feature at the current time instant, and an output of a decoding layer of the whispered speech converting model at the previous time instant are taken as an input of the decoding layer at the current time instant, to acquire an output of the decoding layer at the current time instant as the normal speech acoustic feature.

Figure 6:
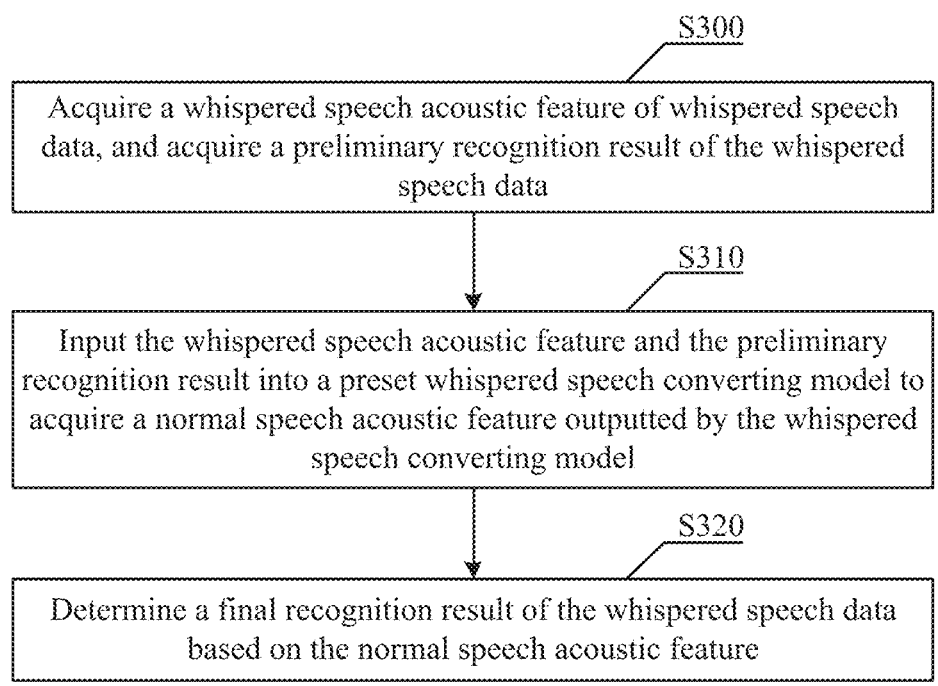
FIG. 6 is a flowchart of another method for converting a whispered speech according to an embodiment of the present disclosure.

In another embodiment of the present disclosure, another method for converting a whispered speech is provided, as shown in FIG. 6, the method may include steps S300 to S320.

In step S300, a whispered speech acoustic feature of whispered speech data and a preliminary recognition result of the whispered speech data are acquired.

In step S310, the whispered speech acoustic feature and the preliminary recognition result are inputted into a preset whispered speech converting model to acquire a normal speech acoustic feature outputted by the whispered speech converting model.

The whispered speech converting model is trained in advance by using recognition results of whispered speech training data and whispered speech training acoustic features of the whispered speech training data as samples and using normal speech acoustic features of normal speech data parallel to the whispered speech training data as sample labels.

It should be noted that, the steps S300 to S310 in this embodiment correspond to the steps S100 to S110 in the foregoing embodiment respectively, and reference may be made to the above content for detailed description, which is not described here.

In step S320, a final recognition result of the whispered speech data is determined based on the normal speech acoustic feature.

In this embodiment, after the normal speech acoustic feature is acquired, the final recognition result of the whispered speech data is determined based on the normal speech acoustic feature, and the final recognition result may be in a text form.

It can be understood that, in the present disclosure, the normal speech acoustic feature may be used to synthesize a normal speech for output, which is specifically selected according to application needs.

Compared with the foregoing embodiment, a process of determining the final recognition result of the whispered speech data by using the normal speech acoustic feature is added in the present embodiment, and the final recognition result may be used for storage, recording, and the like.

Optionally, in an embodiment, after the final recognition result is determined based on the normal speech acoustic feature in step S320, the final recognition result may be merged with the lip shape recognition result outputted by the lip shape recognition model described in the foregoing embodiment, to acquire a merged result as an updated final recognition result, thereby further improving the accuracy of the final recognition result.

Two implementations for the above described step S320 of determining a final recognition result of the whispered speech data based on the normal speech acoustic feature is described in another embodiment of the present disclosure.

The first implementation for the step S320 includes following steps 1) and 2). In step 1), the normal speech acoustic feature is inputted into a preset normal speech recognition model to acquire a normal speech recognition result outputted by the normal speech recognition model. In step 2), the normal speech recognition result is determined as the final recognition result of the whispered speech data.

Reference may be made to the foregoing description for the normal speech recognition model, and details are not described herein again. In this implementation, the normal speech recognition result outputted by the normal speech recognition model is directly used as the final recognition result.

The second implementation for the step S320:

For ease of understanding, the process of the above step S320 is described in conjunction with a complete process for converting a whispered speech in this embodiment.

Figure 7:
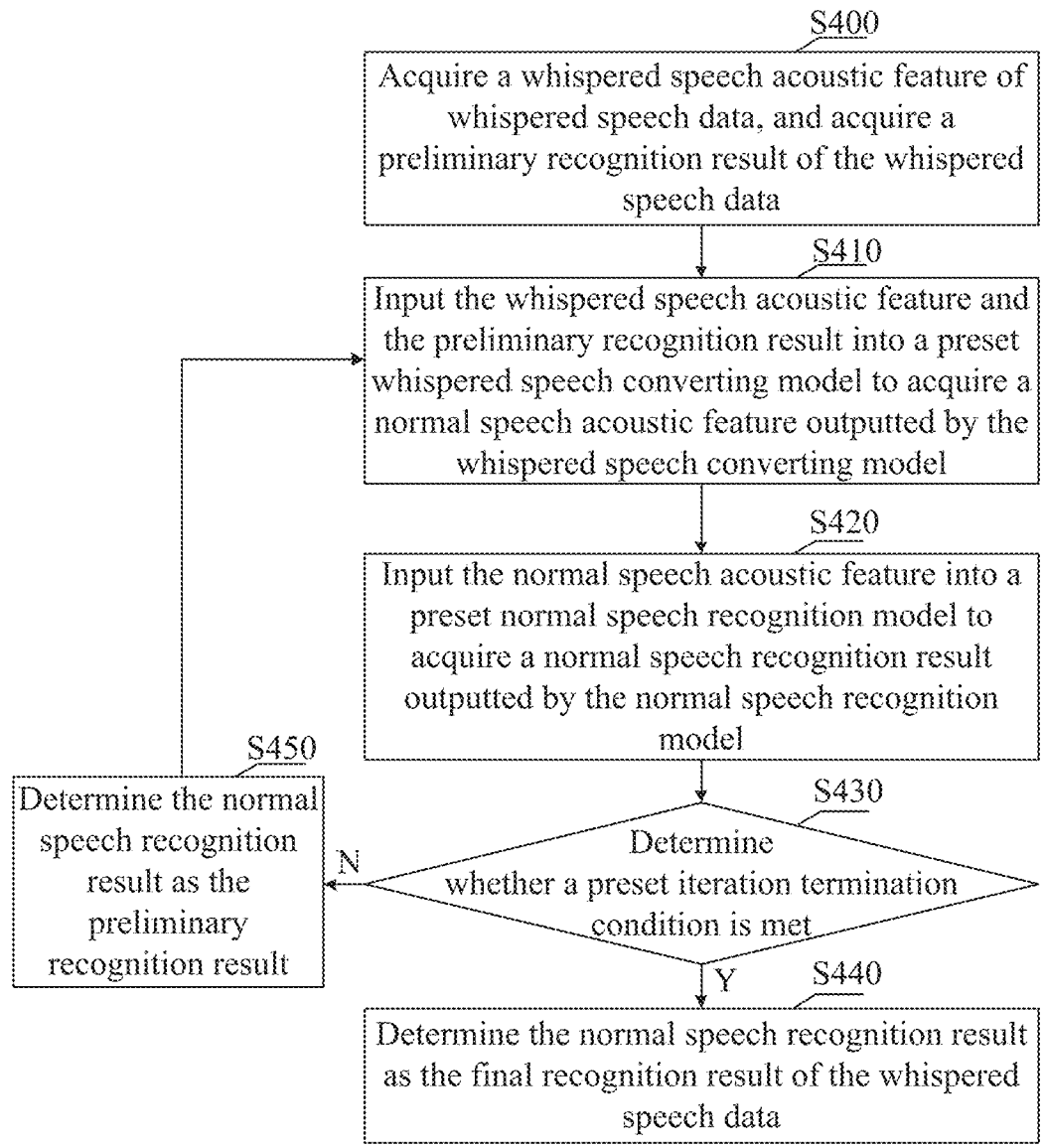
FIG. 7 is a flowchart of another method for converting a whispered speech according to an embodiment of the present disclosure.

FIG. 7 is a flowchart of another method for converting a whispered speech according to an embodiment of the present disclosure. As shown in FIG. 7, the method includes steps S400 to S450.

In step S400, a whispered speech acoustic feature of whispered speech data and a preliminary recognition result of the whispered speech data are acquired.

In step S410, the whispered speech acoustic feature and the preliminary recognition result are inputted into a preset whispered speech converting model to acquire a normal speech acoustic feature outputted by the whispered speech converting model.

It should be noted that, the steps S400 to S410 in this embodiment correspond to the steps S100 to S110 in the foregoing embodiment respectively, and reference may be made to the above content for detailed description, which is not described here.

In step S420, the normal speech acoustic feature is inputted into a preset normal speech recognition model to acquire a normal speech recognition result outputted by the normal speech recognition model.

In step S430, it is determined whether a preset iteration termination condition is satisfied. Step S440 is performed in a case that the preset iteration termination condition is satisfied. Step S450 is performed in a case that the preset iteration termination condition is not satisfied.

In step S440, the normal speech recognition result is determined as the final recognition result of the whispered speech data.

In step S450, the normal speech recognition result is determined as the preliminary recognition result and it is returned to perform the step S410.

Compared with the first implementation, an iteration process is added based on the whispered speech converting model in the present embodiment; that is, the normal speech recognition result outputted by the normal speech recognition model is further used as the preliminary recognition result, which is inputted to the whispered speech converting model for iteration until the preset iteration termination condition is satisfied.

It can be understood that there may be multiple preset iteration termination conditions, such as the number of times of iterations for the whispered speech converting model reaching a threshold for number of times, the iteration time reaching a time threshold, or the convergence of the confidence of the normal speech recognition result reaching a preset convergence condition.

Specifically, the threshold for the number of times and the time threshold may be determined according to requirements of the actual task for system response time and computing resources.

It can be understood that a higher number of times of iterations leads to a higher accuracy of the final recognition result and more consuming time and computing resources.

An apparatus for converting a whispered speech provided in the embodiment of the present disclosure is described below, and the apparatus for converting a whispered speech described below and the above described method for converting a whispered speech may be referred to each other.

Figure 8:
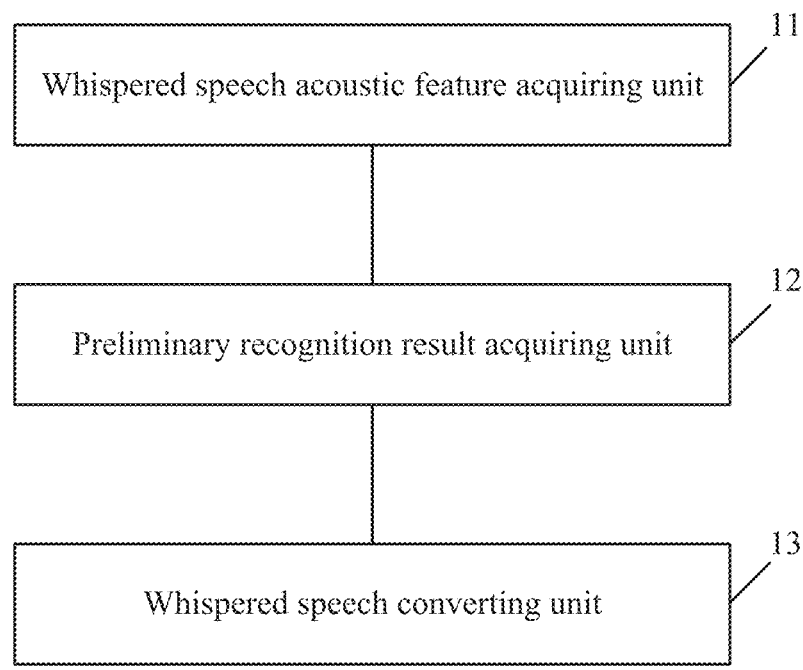
FIG. 8 is a schematic structural diagram of an apparatus for converting a whispered speech according to an embodiment of the present disclosure.

Referring to FIG. 8, FIG. 8 is a schematic structural diagram of an apparatus for converting a whispered speech according to an embodiment of the present disclosure. As shown in FIG. 8, the apparatus may include a whispered speech acoustic feature acquiring unit 11, a preliminary recognition result acquiring unit 12 and a whispered speech converting unit 13.

The whispered speech acoustic feature acquiring unit 11 is configured to acquire a whispered speech acoustic feature of whispered speech data.

The preliminary recognition result acquiring unit 12 is configured to acquire a preliminary recognition result of the whispered speech data.

The whispered speech converting unit 13 is configured to input the whispered speech acoustic feature and the preliminary recognition result into a preset whispered speech converting model to acquire a normal speech acoustic feature outputted by the whispered speech converting model.

The whispered speech converting model is trained in advance by using recognition results of whispered speech training data and whispered speech training acoustic features of the whispered speech training data as samples and using normal speech acoustic features of normal speech data parallel to the whispered speech training data as sample labels.

Optionally, the preliminary recognition result acquiring unit may include a first preliminary recognition result acquiring subunit configured to input the whispered speech acoustic feature into a preset whispered speech recognition model to acquire a whispered speech recognition result outputted by the whispered speech recognition model as the preliminary recognition result of the whispered speech data. The whispered speech recognition model is acquired by taking a normal speech recognition model as an initial model and training the initial model by using whispered speech training acoustic features labeled with recognition results of whispered speech training data.

Optionally, the apparatus according to the disclosure may further include a lip shape image data acquiring unit configured to acquire lip shape image data matching the whispered speech data. The preliminary recognition result acquiring unit may further include a second preliminary recognition result acquiring subunit and a third preliminary recognition result acquiring subunit. The second preliminary recognition result acquiring subunit is configured to input the lip shape image data into a preset lip shape recognition model to acquire a lip shape recognition result outputted by the lip shape recognition model. The lip shape recognition model is trained in advance by using lip shape image training data labeled with lip shape recognition results. The third preliminary recognition result acquiring subunit is configured to merge the whispered speech recognition result with the lip shape recognition result to acquire a merged recognition result as the preliminary recognition result of the whispered speech data.

Optionally, the apparatus according to the disclosure may further include a lip detecting unit and an image processing unit. The lip detecting unit is configured to perform lip detection on each frame of lip shape images of the lip shape image data to acquire a lip region. The image processing unit is configured to extract the lip region from the lip shape image including the lip region and perform an image regularization process on the lip region to acquire regularized lip shape image data as an input of the lip shape recognition model.

Optionally, the whispered speech acoustic feature acquiring unit may include a framing processing unit, a pre-emphasis processing unit and a spectrum feature extracting unit. The framing processing unit is configured to segment the whispered speech data into frames to acquire multiple frames of whispered speech data. The pre-emphasis processing unit is configured to perform a pre-emphasis process on each frame of whispered speech data to acquire a frame of pre-emphasis processed whispered speech data. The spectrum feature extracting unit is configured to extract a spectrum feature of each frame of pre-emphasis processed whispered speech data. The spectrum feature includes one or more of a LogFilter Bank Energy feature, a Mel Frequency Cepstrum Coefficient feature, or a Perceptual Linear Predictive feature.

Optionally, two structures of the whispered speech converting unit are provided according to the embodiment.

In a first structure of the whispered speech converting unit, the whispered speech converting unit may include a recursive processing unit configured to input the whispered speech acoustic feature and the preliminary recognition result into a whispered speech converting model having a recurrent neural network type, to acquire the normal speech acoustic feature outputted by the whispered speech converting model.

In a second structure of the whispered speech converting unit, the whispered speech converting unit may include a codec processing unit. The codec processing unit includes a first codec processing subunit, a second codec processing subunit, a third codec processing subunit, and a fourth codec processing subunit. The first codec processing subunit is configured to input the whispered speech acoustic feature and the preliminary recognition result into a whispered speech converting model having a codec type of attention-based mechanism. The second codec processing subunit is configured to encode the whispered speech acoustic feature and the preliminary recognition result by using a coding layer of the whispered speech converting model, to acquire an encoded whispered speech acoustic feature and an encoded preliminary recognition result. The third codec processing subunit is configured to perform coefficient linear weighting on the encoded whispered speech acoustic feature by using an attention layer of the whispered speech converting model, to acquire a weighted whispered speech acoustic feature at a current time instant. The fourth codec processing subunit is configured to take the encoded preliminary recognition result, the weighted whispered speech acoustic feature at the current time instant, and an output of a decoding layer of the whispered speech converting model at the previous time instant as an input of the decoding layer at the current time instant, to acquire an output of the decoding layer at the current time instant as the normal speech acoustic feature.

Optionally, the apparatus according to the disclosure may further include a final recognition result determining unit configured to determine a final recognition result of the whispered speech data based on the normal speech acoustic feature.

Optionally, two structures of the final recognition result determining unit are provided according to the embodiment.

In a first structure of the final recognition result determining unit, the final recognition result determining unit may include a normal speech recognition unit and a first result determining unit. The normal speech recognition unit is configured to input the normal speech acoustic feature into a preset normal speech recognition model to acquire a normal speech recognition result outputted by the normal speech recognition model. The first result determining unit is configured to determine the normal speech recognition result as the final recognition result of the whispered speech data.

In a second structure of the final recognition result determining unit, the final recognition result determining unit may include a normal speech recognition unit, an iteration determining unit, a second result determining unit, and a third result determining unit. The normal speech recognition unit is configured to input the normal speech acoustic feature into a preset normal speech recognition model to acquire a normal speech recognition result outputted by the normal speech recognition model. The iteration determining unit is configured to determine whether a preset iteration termination condition is satisfied. The second result determining unit is configured to determine the normal speech recognition result as the final recognition result of the whispered speech data, in a case that the iteration determining unit determines that the preset iteration termination condition is satisfied. The third result determining unit is configured to determine the normal speech recognition result as the preliminary recognition result and return to perform the process of inputting the whispered speech acoustic feature and the preliminary recognition result into the preset whispered speech converting model, in a case that the iteration determining unit determines that the preset iteration termination condition is not satisfied.

Figure 9:
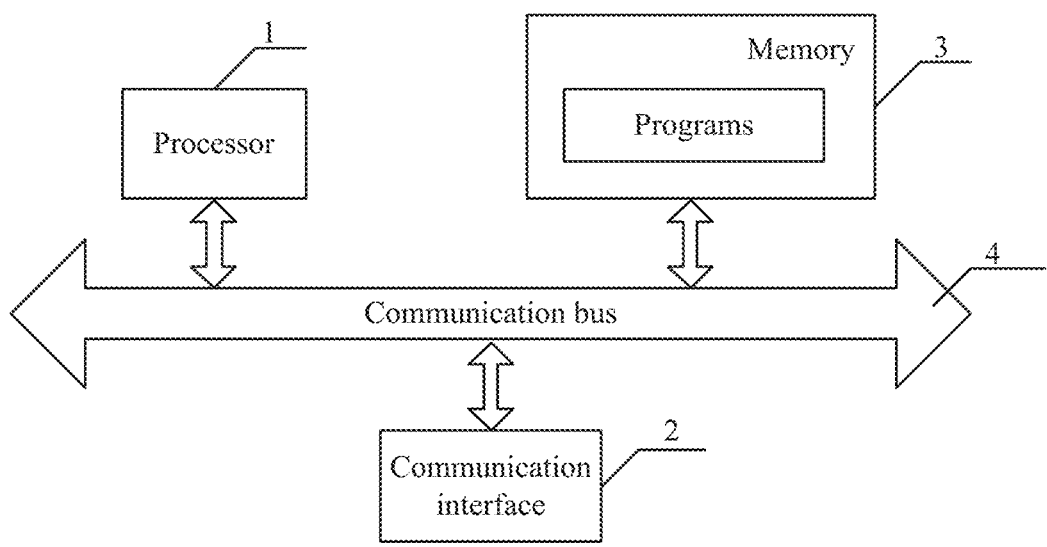
FIG. 9 is a block diagram showing a hardware structure of a device for converting a whispered speech according to an embodiment of the present disclosure.

The apparatus for converting a whispered speech provided in the embodiment of the present disclosure may be applied to a device for converting a whispered speech, such as a PC terminal, a cloud platform, a server, a server cluster. Optionally, FIG. 9 is a block diagram showing a hardware structure of the device for converting a whispered speech. Referring to FIG. 9, the hardware structure of the device for converting the whispered speech may include at least one processor 1, at least one communication interface 2, at least one memory 3, and at least a communication bus 4.

In the embodiment of the present disclosure, the number of the processor 1, the communication interface 2, the memory 3, and the communication bus 4 is at least one, and the processor 1, the communication interface 2, and the memory 3 communicates with each other through the communication bus 4.

The processor 1 may be a central processing unit CPU, or an application specific integrated circuit (ASIC), or one or more integrated circuits configured to implement the embodiments of the present disclosure.

The memory 3 may include a high speed RAM memory, or may further include a non-volatile memory, such as at least one magnetic disk memory.

The memory stores programs, and the processor may execute the programs stored in the memory to: acquire a whispered speech acoustic feature of whispered speech data, and acquire a preliminary recognition result of the whispered speech data; and input the whispered speech acoustic feature and the preliminary recognition result into a preset whispered speech converting model to acquire a normal speech acoustic feature outputted by the whispered speech converting model. The whispered speech converting model is trained in advance by using recognition results of whispered speech training data and whispered speech training acoustic features of the whispered speech training data as samples and using normal speech acoustic features of normal speech data parallel to the whispered speech training data as sample labels.

Optionally, one may refer to the above description for the detailed function and the extended function of the programs.

A storage medium is further provided in the embodiment of the present disclosure. The storage medium may store programs which may be executed by a processor, the programs are used to: acquire a whispered speech acoustic feature of whispered speech data, and acquire a preliminary recognition result of the whispered speech data; and input the whispered speech acoustic feature and the preliminary recognition result into a preset whispered speech converting model to acquire a normal speech acoustic feature outputted by the whispered speech converting model. The whispered speech converting model is trained in advance by using recognition results of whispered speech training data and whispered speech training acoustic features of the whispered speech training data as samples and using normal speech acoustic features of normal speech data parallel to the whispered speech training data as sample labels.

Optionally, one may refer to the above description for the detailed function and the extended function of the programs.

Finally, it should be noted that the relationship terminologies such as "first", "second" and the like are only used herein to distinguish one entity or operation from another, rather than to necessitate or imply that the actual relationship or order exists between the entities or operations. Moreover, terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Without limiting more, the elements defined by the statement "comprising one . . . " do not exclude that there are other identical elements in the process, method, article, or device that includes said elements.

The above embodiments are described in a progressive manner. Each of the embodiments is mainly focused on describing its differences from other embodiments, and references may be made among these embodiments with respect to the same or similar parts.

With the above description of the disclosed embodiments, those skilled in the art can implement or use the present disclosure. Various modifications made to these embodiments are apparent to those skilled in the art. The general principle defined herein may be implemented in other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. A method for converting a whispered speech, comprising:
    acquiring a whispered speech acoustic feature of whispered speech data, and acquiring a preliminary recognition result of the whispered speech data, wherein the preliminary recognition result is a recognition result for the whispered speech data; and
    inputting the whispered speech acoustic feature and the preliminary recognition result into a preset whispered speech converting model to acquire a normal speech acoustic feature outputted by the whispered speech converting model, wherein
    the whispered speech converting model is trained in advance by using recognition results of whispered speech training data and whispered speech training acoustic features of the whispered speech training data as samples and using normal speech acoustic features of normal speech data parallel to the whispered speech training data as sample labels,
    wherein the acquiring the preliminary recognition result of the whispered speech data comprises:
    inputting the whispered speech acoustic feature into a preset whispered speech recognition model to acquire a whispered speech recognition result outputted by the whispered speech recognition model as the preliminary recognition result of the whispered speech data, wherein the whispered speech recognition model is acquired by taking a normal speech recognition model as an initial model and training the initial model by using whispered speech training acoustic features labeled with recognition results of whispered speech training data.

2. The method according to claim 1, further comprising:
    determining a final recognition result of the whispered speech data based on the normal speech acoustic feature.

3. The method according to claim 1, further comprising:
    acquiring lip shape image data matched with the whispered speech data, wherein
    the acquiring the preliminary recognition result of the whispered speech data further comprises:
    inputting the lip shape image data into a preset lip shape recognition model to acquire a lip shape recognition result outputted by the lip shape recognition model, wherein the lip shape recognition model is trained in advance by using lip shape image training data labeled with lip shape recognition results; and
    merging the whispered speech recognition result and the lip shape recognition result to acquire a merged recognition result as the preliminary recognition result of the whispered speech data.

4. The method according to claim 3, further comprising:
    performing lip detection on each frame of lip shape images of the lip shape image data to acquire a lip region; and
    extracting the lip region from the lip shape image comprising the lip region, performing an image regularization process on the lip region to acquire regularized lip shape image data as an input of the lip shape recognition model.

5. The method according to claim 1, wherein the acquiring the whispered speech acoustic feature of the whispered speech data comprises:
    segmenting the whispered speech data into frames to acquire a plurality of frames of whispered speech data;
    performing a pre-emphasis process on each frame of whispered speech data to acquire a frame of pre-emphasis processed whispered speech data; and
    extracting a spectrum feature of each frame of pre-emphasis processed whispered speech data, wherein the spectrum feature comprises one or more of a LogFilter Bank Energy feature, a Mel Frequency Cepstrum Coefficient feature, and a Perceptual Linear Predictive feature.

6. The method according to claim 1, wherein the inputting the whispered speech acoustic feature and the preliminary recognition result into the preset whispered speech converting model to acquire the normal speech acoustic feature outputted by the whispered speech converting model comprises:
    inputting the whispered speech acoustic feature and the preliminary recognition result into a whispered speech converting model having a recurrent neural network type, to acquire the normal speech acoustic feature outputted by the whispered speech converting model.

7. The method according to claim 1, wherein the inputting the whispered speech acoustic feature and the preliminary recognition result into the preset whispered speech converting model to acquire the normal speech acoustic feature outputted by the whispered speech converting model comprises:
    inputting the whispered speech acoustic feature and the preliminary recognition result into a whispered speech converting model having a codec type of attention mechanism;
    encoding the whispered speech acoustic feature and the preliminary recognition result by using a coding layer of the whispered speech converting model, to acquire an encoded whispered speech acoustic feature and an encoded preliminary recognition result;
    performing coefficient linear weighting on the encoded whispered speech acoustic feature by using an attention layer of the whispered speech converting model, to acquire a weighted whispered speech acoustic feature at a current time instant; and
    taking the encoded preliminary recognition result, the weighted whispered speech acoustic feature at the current time instant, and an output of a decoding layer of the whispered speech converting model at the previous time instant as an input of the decoding layer at the current time instant, to acquire an output of the decoding layer at the current time instant as the normal speech acoustic feature.

8. The method according to claim 2, wherein the determining the final recognition result of the whispered speech data based on the normal speech acoustic feature comprises:
    inputting the normal speech acoustic feature into a preset normal speech recognition model to acquire a normal speech recognition result outputted by the normal speech recognition model; and determining the normal speech recognition result as the final recognition result of the whispered speech data.

9. The method according to claim 2, wherein the determining the final recognition result of the whispered speech data based on the normal speech acoustic feature comprises:

inputting the normal speech acoustic feature into a preset normal speech recognition model to acquire a normal speech recognition result outputted by the normal speech recognition model;

determining whether a preset iteration termination condition is met;

determining the normal speech recognition result as the final recognition result of the whispered speech data, in a case that the preset iteration termination condition is met; and determining the normal speech recognition result as the preliminary recognition result and returning to perform the process of inputting the whispered speech acoustic feature and the preliminary recognition result into the preset whispered speech converting model, in a case that the preset iteration termination condition is not met.

10. An apparatus for converting a whispered speech, comprising:

a whispered speech acoustic feature acquiring unit, configured to acquire a whispered speech acoustic feature of whispered speech data;

a preliminary recognition result acquiring unit, configured to acquire a preliminary recognition result of the whispered speech data, wherein the preliminary recognition result is a recognition result for the whispered speech data;

a whispered speech converting unit, configured to input the whispered speech acoustic feature and the preliminary recognition result into a preset whispered speech converting model to acquire a normal speech acoustic feature outputted by the whispered speech converting model, wherein the whispered speech converting model is trained in advance by using recognition results of whispered speech training data and whispered speech training acoustic features of the whispered speech training data as samples and using normal speech acoustic features of normal speech data parallel to the whispered speech training data as sample labels, wherein the preliminary recognition result acquiring unit comprises:

a first preliminary recognition result acquiring subunit, configured to input the whispered speech acoustic feature into a preset whispered speech recognition model to acquire a whispered speech recognition result outputted by the whispered speech recognition model as the preliminary recognition result of the whispered speech data, wherein the whispered speech recognition model is acquired by taking a normal speech recognition model as an initial model and training the initial model by using whispered speech training acoustic features labeled with recognition results of whispered speech training data.

11. The apparatus according to claim 10, further comprising:

a final recognition result determining unit, configured to determine a final recognition result of the whispered speech data based on the normal speech acoustic feature.

12. The apparatus according to claim 10, further comprising:

a lip shape image data acquiring unit, configured to acquire lip shape image data matched with the whispered speech data;

the preliminary recognition result acquiring unit further comprises:

a second preliminary recognition result acquiring subunit, configured to input the lip shape image data into a preset lip shape recognition model to acquire a lip shape recognition result outputted by the lip shape recognition model, wherein the lip shape recognition model is trained in advance by using lip shape image training data labeled with lip shape recognition results; and a third preliminary recognition result acquiring subunit, configured to merge the whispered speech recognition result and the lip shape recognition result to acquire a merged recognition result as the preliminary recognition result of the whispered speech data.

13. The apparatus according to claim 12, further comprising:

a lip detecting unit, configured to perform lip detection on each frame of lip shape images of the lip shape image data to acquire a lip region; and an image processing unit, configured to extract the lip region from the lip shape image comprising the lip region and perform an image regularization process on the lip region to acquire regularized lip shape image data as an input of the lip shape recognition model.

14. The apparatus according to claim 10, wherein the whispered speech acoustic feature acquiring unit comprises:

a framing processing unit, configured to segment the whispered speech data into frames to acquire a plurality of frames of whispered speech data;

a pre-emphasis processing unit, configured to perform a pre-emphasis process on each frame of whispered speech data to acquire a frame of pre-emphasis processed whispered speech data; and a spectrum feature extracting unit, configured to extract a spectrum feature of each frame of pre-emphasis processed whispered speech data, wherein the spectrum feature comprises one or more of a LogFilter Bank Energy feature, a Mel Frequency Cepstrum Coefficient feature, and a Perceptual Linear Predictive feature.

15. The apparatus according to claim 10, wherein the whispered speech converting unit comprises:

a recursive processing unit, configured to input the whispered speech acoustic feature and the preliminary recognition result into a whispered speech converting model having a recurrent neural network type, to acquire the normal speech acoustic feature outputted by the whispered speech converting model.

16. The apparatus according to claim 10, wherein the whispered speech converting unit comprises a codec processing unit, the codec processing unit comprises:

a first codec processing subunit, configured to input the whispered speech acoustic feature and the preliminary recognition result into a whispered speech converting model having a codec type of attention mechanism;

a second codec processing subunit, configured to encode the whispered speech acoustic feature and the preliminary recognition result by using a coding layer of the whispered speech converting model, to acquire an encoded whispered speech acoustic feature and an encoded preliminary recognition result;

a third codec processing subunit, configured to perform coefficient linear weighting on the encoded whispered speech acoustic feature by using an attention layer of the whispered speech converting model, to acquire a weighted whispered speech acoustic feature at a current time instant; and a fourth codec processing subunit, configured to take the encoded preliminary recognition result, the weighted whispered speech acoustic feature at the current time instant, and an output of a decoding layer of the whispered speech converting model at the previous time instant as an input of the decoding layer at the current time instant, to acquire an output of the decoding layer at the current time instant as the normal speech acoustic feature.

17. The apparatus according to claim 11, wherein the final recognition result determining unit comprises:

a normal speech recognition unit, configured to input the normal speech acoustic feature into a preset normal speech recognition model to acquire a normal speech recognition result outputted by the normal speech recognition model; and a first result determining unit, configured to determine the normal speech recognition result as the final recognition result of the whispered speech data.

18. The apparatus according to claim 11, wherein the final recognition result determining unit comprises:

a normal speech recognition unit, configured to input the normal speech acoustic feature into a preset normal speech recognition model to acquire a normal speech recognition result outputted by the normal speech recognition model;

an iteration determining unit, configured to determine whether a preset iteration termination condition is met;

a second result determining unit, configured to determine the normal speech recognition result as the final recognition result of the whispered speech data, in a case that the iteration determining unit determines that the preset iteration termination condition is met; and a third result determining unit, configured to determine the normal speech recognition result as the preliminary recognition result and return to perform the process of inputting the whispered speech acoustic feature and the preliminary recognition result into the preset whispered speech converting model, in a case that the iteration determining unit determines that the preset iteration termination condition is not met.

* * * * *